US010513281B2

(12) United States Patent
Bacallao (10) Patent No.: US 10,513,281 B2
(45) Date of Patent: Dec. 24, 2019

(54) SHOPPING CART BAGGING STATION AND METHOD OF FORMING THE SAME

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 52 days.

(21) Appl. No.: 15/676,143

(22) Filed: Aug. 14, 2017

(65) Prior Publication Data

US 2018/0050713 A1    Feb. 22, 2018

Related U.S. Application Data

(60) Provisional application No. 62/377,135, filed on Aug. 19, 2016, provisional application No. 62/377,143, filed on Aug. 19, 2016.

(51) Int. Cl.
*B62B 3/10* (2006.01)
*B65B 67/12* (2006.01)
(Continued)

(52) U.S. Cl.
CPC ............ *B62B 3/106* (2013.01); *A47F 13/085* (2013.01); *B62B 3/1464* (2013.01);
(Continued)

(58) Field of Classification Search
CPC .. B62B 3/106; B65B 67/1266; B65B 67/1227
(Continued)

(56) References Cited

U.S. PATENT DOCUMENTS 259,932 A    6/1882   Sims
370,563 A    9/1887   Simmons
(Continued)

FOREIGN PATENT DOCUMENTS

AU    1142402 A1    4/2002
AU    2002364902 A1    5/2004
(Continued)

OTHER PUBLICATIONS

Search Report in UK Patent Application No. GB1621562.6, dated Jun. 14, 2017; 4 pages.
(Continued)

*Primary Examiner* — Michael Safavi
(74) *Attorney, Agent, or Firm* — Schmeiser, Olsen & Watts LLP; Karen E. Jachimowicz (57) ABSTRACT

Disclosed is a shopping cart bagging station that couples to a shopping cart. The shopping cart bagging station includes a center piece, a first and a second handle arm assembly, and a back plate. The center piece includes a bag holder hook that at least one shopping bag hangs from. The first and the second handle arm assembly each include a handle holder arm that an arm of the shopping bag hangs from. The back plate couples the bagging station to a shopping cart by securing a side of the shopping cart between the back plate and the center piece. The shopping cart bagging station can be mounted in various locations on a shopping cart, making it easy and convenient for a customer to carry and load a number of shopping bags as they shop.

20 Claims, 9 Drawing Sheets

(51) Int. Cl.
 *A47F 13/08* (2006.01)
 *B62B 3/14* (2006.01)
(52) U.S. Cl.
 CPC ...... *B65B 67/1227* (2013.01); *B65B 67/1266* (2013.01); *B62B 3/146* (2013.01)
(58) Field of Classification Search
 USPC ...... 248/100; 383/23; 280/288.4; 211/85.15; 224/411
 See application file for complete search history.

(56) References Cited

U.S. PATENT DOCUMENTS

| | | | |
|---|---|---|---|
| 477,235 A * | 6/1892 | Timmerman | B65B 67/12 248/99 |
| 562,229 A | 6/1896 | Lenney | |
| 635,100 A * | 10/1899 | Huebel | A47J 43/287 248/213.2 |
| 765,388 A * | 7/1904 | Lanpher | B65F 1/1415 248/97 |
| 797,871 A | 8/1905 | Smith | |
| 809,568 A | 1/1906 | Hulburt | |
| 873,188 A | 12/1907 | Thumann | |
| 890,693 A | 6/1908 | McCoy | |
| 893,930 A | 7/1908 | Lederman | |
| 896,443 A | 8/1908 | Dyett | |
| 936,736 A | 10/1909 | Porter et al. | |
| 995,798 A | 6/1911 | McCullough | |
| 1,055,745 A | 3/1913 | Harrison | |
| 1,069,108 A | 8/1913 | Buhl | |
| 1,252,740 A | 1/1918 | Thornblade | |
| 1,281,656 A | 10/1918 | Raschick | |
| 1,284,579 A | 11/1918 | Brown | |
| 1,653,393 A * | 12/1927 | Cox | B65B 67/1205 141/390 |
| 1,662,140 A | 3/1928 | Whitesides | |
| 2,240,629 A | 5/1941 | Smith | |
| 2,305,863 A * | 12/1942 | Ginter | B65B 67/1227 248/100 |
| 2,498,446 A | 2/1950 | Pawsat | |
| 2,563,679 A | 8/1951 | Hardy | |
| 2,603,438 A | 7/1952 | Adams | |
| 2,682,956 A | 7/1954 | Pike | |
| 2,797,058 A | 6/1957 | Packham | |
| 2,998,955 A | 9/1961 | Hertzog | |
| 3,133,660 A | 5/1964 | Roberts | |
| 3,266,742 A | 8/1966 | Pena | |
| 3,313,504 A | 4/1967 | Thorkild | |
| 3,339,745 A | 9/1967 | Sugerman | |
| D209,279 S | 11/1967 | Cohen | |
| 3,438,644 A | 4/1969 | Kaplan et al. | |
| 3,475,067 A | 10/1969 | Girard | |
| 3,747,298 A | 7/1973 | Lieberman | |
| 3,861,630 A * | 1/1975 | Ady | B65B 67/125 248/100 |
| 3,930,696 A | 1/1976 | Hight et al. | |
| 3,943,859 A | 3/1976 | Boone | |
| 3,995,803 A | 12/1976 | Uitz | |
| 4,048,754 A | 9/1977 | Laux | |
| 4,082,939 A | 4/1978 | Walters | |
| 4,106,617 A | 8/1978 | Boone | |
| 4,269,336 A | 5/1981 | Humlong | |
| 4,305,558 A | 12/1981 | Baker | |
| 4,354,643 A | 10/1982 | Kenner | |
| 4,367,819 A | 1/1983 | Lewis | |
| 4,376,502 A | 3/1983 | Cohen | |
| 4,398,689 A * | 8/1983 | Prader | B65B 67/1227 248/99 |
| 4,403,807 A | 9/1983 | Wilkinson et al. | |
| 4,456,125 A | 6/1984 | Chap | |
| 4,480,810 A | 11/1984 | Hall | |
| 4,576,388 A | 3/1986 | Pope | |
| 4,583,753 A | 4/1986 | Economy | |
| 4,595,153 A | 6/1986 | Goetz | |
| 4,655,409 A | 4/1987 | Zima | |
| 4,682,782 A | 7/1987 | Mills | |
| 4,702,402 A | 10/1987 | Ferri | |
| 4,728,070 A | 3/1988 | Engelbrecht | |
| 4,838,504 A * | 6/1989 | Bittenbinder | B65B 67/1227 248/100 |
| 4,840,336 A * | 6/1989 | Stroh | B65B 67/1227 248/175 |
| D302,062 S | 7/1989 | Sable | |
| 4,858,862 A * | 8/1989 | Prader | B65B 67/1227 248/99 |
| 4,863,125 A * | 9/1989 | Bateman | B65B 67/1266 248/97 |
| 4,881,577 A | 11/1989 | Stroh et al. | |
| 4,881,706 A | 11/1989 | Sedlik | |
| 4,968,047 A | 11/1990 | Ferris | |
| 4,974,799 A | 12/1990 | Palmer | |
| 4,997,149 A | 3/1991 | Koch | |
| 4,998,647 A | 3/1991 | Sharp | |
| 4,998,694 A * | 3/1991 | Barteaux | B65B 67/1216 248/100 |
| 5,002,215 A | 3/1991 | Gregoire | |
| 5,005,791 A | 4/1991 | Lanzen | |
| 5,190,253 A | 3/1993 | Sable | |
| 5,362,077 A | 11/1994 | Adamson | |
| 5,366,123 A | 11/1994 | Range | |
| 5,385,318 A | 1/1995 | Rizzuto | |
| 5,390,443 A | 2/1995 | Emalfarb et al. | |
| 5,427,288 A | 6/1995 | Trubee | |
| 5,437,346 A | 8/1995 | Dumont | |
| 5,439,120 A | 8/1995 | Brozak | |
| 5,443,173 A | 8/1995 | Emery et al. | |
| D363,208 S | 10/1995 | Seidel | |
| 5,460,279 A | 10/1995 | Emery et al. | |
| 5,465,846 A | 11/1995 | Blyth et al. | |
| 5,503,297 A | 4/1996 | Frankel | |
| 5,513,823 A | 5/1996 | Bresnahan | |
| 5,531,366 A | 7/1996 | Strom | |
| 5,533,361 A | 7/1996 | Halpem | |
| 5,564,566 A | 10/1996 | Lamb | |
| 5,618,008 A | 4/1997 | Dearwester et al. | |
| 5,704,497 A | 1/1998 | Wyatt | |
| 5,727,721 A | 3/1998 | Guido et al. | |
| D396,372 S | 7/1998 | Goodman | |
| 5,836,486 A | 11/1998 | Ohsugi | |
| 5,875,902 A | 3/1999 | Emery et al. | |
| 5,915,584 A | 6/1999 | Sposit et al. | |
| D412,080 S | 7/1999 | Emery et al. | |
| 5,924,573 A * | 7/1999 | Piraneo | B65D 33/001 206/554 |
| 5,979,841 A * | 11/1999 | Piraneo | B65D 33/001 206/554 |
| 6,018,397 A | 1/2000 | Cloutier et al. | |
| 6,041,945 A | 3/2000 | Faraj | |
| 6,086,023 A | 7/2000 | Kerr et al. | |
| 6,109,462 A * | 8/2000 | Emalfarb | A47G 7/044 211/119 |
| 6,152,408 A | 11/2000 | O'Grady | |
| 6,155,521 A | 12/2000 | O'hanlon | |
| 6,170,679 B1 | 1/2001 | Frye | |
| 6,193,265 B1 | 2/2001 | Yemini | |
| 6,264,035 B1 * | 7/2001 | Petrie | A47F 9/042 206/554 |
| 6,299,001 B1 | 10/2001 | Frolov et al. | |
| 6,305,572 B1 | 10/2001 | Daniels et al. | |
| D452,944 S | 1/2002 | Schmidt | |
| 6,341,704 B1 | 1/2002 | Michel, Jr. | |
| 6,364,266 B1 | 4/2002 | Garvin | |
| 6,374,577 B1 | 4/2002 | Ventura | |
| 6,390,422 B2 | 5/2002 | Banko | |
| 6,409,031 B1 | 6/2002 | Wynne | |
| D459,979 S | 7/2002 | Goodman | |
| 6,481,583 B1 | 11/2002 | Black et al. | |
| 6,543,638 B2 | 4/2003 | Wile | |
| 6,561,403 B1 | 5/2003 | Kannankeril et al. | |
| 6,601,759 B2 | 8/2003 | Fife et al. | |
| 6,606,411 B1 | 8/2003 | Loui et al. | |
| 6,607,229 B1 | 8/2003 | McIntosh | |

(56) References Cited

U.S. PATENT DOCUMENTS

| | | |
|---|---|---|
| 6,648,265 B2 | 11/2003 | Goldberg |
| 6,655,537 B1 | 12/2003 | Lang et al. |
| 6,685,075 B1 | 2/2004 | Kannankeril |
| 6,726,145 B1 | 4/2004 | Kraus |
| 6,726,156 B1 | 4/2004 | Scola |
| D490,691 S | 6/2004 | Buss et al. |
| 6,745,186 B1 | 6/2004 | Testa et al. |
| 6,789,687 B2 | 9/2004 | Cramer |
| 6,805,271 B2 | 10/2004 | Holden |
| 6,810,149 B1 | 10/2004 | Squilla et al. |
| 6,832,739 B1 | 12/2004 | Kraus |
| 6,886,101 B2 | 4/2005 | Glazer et al. |
| 6,937,989 B2 | 8/2005 | Mcintyre et al. |
| 7,066,389 B2 | 6/2006 | Dickover et al. |
| 7,077,612 B1 | 7/2006 | Giggle, III et al. |
| 7,128,251 B1 | 10/2006 | Galle |
| 7,172,092 B2 | 2/2007 | Yang et al. |
| 7,177,820 B2 | 2/2007 | Mcintyre et al. |
| 7,182,210 B2 | 2/2007 | Metcalf |
| 7,192,035 B1 | 3/2007 | Lioce |
| D540,591 S | 4/2007 | Snell |
| 7,222,363 B2 | 5/2007 | Rice et al. |
| D552,901 S | 10/2007 | Wilfong, Jr. et al. |
| D571,518 S | 6/2008 | Waldman |
| D575,973 S | 9/2008 | Goodman et al. |
| 7,431,208 B2 | 10/2008 | Feldman et al. |
| 7,475,885 B2 | 1/2009 | Kovath |
| 7,530,537 B2 | 5/2009 | Kandah |
| 7,587,756 B2 | 9/2009 | Peart et al. |
| 7,610,717 B2 | 11/2009 | Luken et al. |
| 7,654,409 B2 | 2/2010 | Hoffman |
| 7,677,507 B1 * | 3/2010 | Rothbauer ............ B65B 67/12 248/100 |
| 7,716,064 B2 | 5/2010 | Mcintyre et al. |
| D616,680 S | 6/2010 | Snider |
| 7,789,248 B1 | 9/2010 | Salerno et al. |
| 7,850,014 B2 | 12/2010 | Nguyen et al. |
| 7,887,068 B2 | 2/2011 | Ferguson |
| 8,002,127 B2 | 8/2011 | Ward et al. |
| 8,069,092 B2 | 11/2011 | Bryant |
| D650,209 S | 12/2011 | Snider |
| D654,737 S | 2/2012 | Guindi |
| 8,177,079 B2 | 5/2012 | Schwartzkopf et al. |
| D666,858 S | 9/2012 | Goodman |
| D667,250 S | 9/2012 | Goodman et al. |
| 8,292,094 B2 | 10/2012 | Morton |
| 8,336,800 B1 | 12/2012 | Lopez |
| 8,403,343 B1 | 3/2013 | Seawel |
| D689,282 S | 9/2013 | Lindeman |
| 8,572,712 B2 | 10/2013 | Rice et al. |
| D693,577 S | 11/2013 | Goodman et al. |
| 8,640,890 B2 | 2/2014 | Schiller |
| 8,668,207 B1 | 3/2014 | Gilliam |
| 8,746,640 B2 | 6/2014 | Broadley et al. |
| 8,814,039 B2 | 8/2014 | Bishop et al. |
| D713,663 S | 9/2014 | Pryor |
| 8,820,633 B2 | 9/2014 | Bishop et al. |
| 8,851,369 B2 | 10/2014 | Bishop et al. |
| D718,054 S | 11/2014 | Goodman et al. |
| D719,372 S | 12/2014 | Goodman et al. |
| 8,905,411 B1 | 12/2014 | Blanton |
| D720,538 S | 1/2015 | Goodman et al. |
| D728,255 S | 5/2015 | Guindi et al. |
| 9,199,656 B1 | 12/2015 | Tong et al. |
| D746,592 S | 1/2016 | Goodman et al. |
| D747,876 S | 1/2016 | Goodman et al. |
| D750,472 S | 3/2016 | Kuka |
| D751,763 S | 3/2016 | Goodman et al. |
| D784,721 S | 4/2017 | Goodman et al. |
| 9,623,995 B2 | 4/2017 | Tan |
| D785,333 S | 5/2017 | Goodman et al. |
| D785,369 S | 5/2017 | Goodman et al. |
| D787,303 S | 5/2017 | Garvin |
| 9,656,827 B2 | 5/2017 | Sudhir |
| 9,694,840 B2 | 7/2017 | Hendrick et al. |
| 9,737,141 B2 | 8/2017 | Johnson |
| D796,771 S | 9/2017 | Bacallao et al. |
| D803,032 S | 11/2017 | Jammehdiabadi |
| 9,844,283 B2 | 12/2017 | Bacallao |
| 10,173,708 B1 | 1/2019 | Bacallao |
| 10,179,599 B1 | 1/2019 | Lambrecht |
| 2001/0022333 A1 | 9/2001 | Banko |
| 2002/0060276 A1 | 5/2002 | Rosler |
| 2002/0145086 A1 | 10/2002 | Alvarado et al. |
| 2002/0170937 A1 | 11/2002 | Yeh et al. |
| 2002/0185510 A1 | 12/2002 | Holsclaw |
| 2002/0185513 A1 | 12/2002 | Morris |
| 2003/0000905 A1 | 1/2003 | Zidek |
| 2003/0042694 A1 | 3/2003 | Werner |
| 2003/0052464 A1 | 3/2003 | McGuire |
| 2003/0098326 A1 | 5/2003 | Wile |
| 2003/0121871 A1 | 7/2003 | Zadro |
| 2003/0198390 A1 | 10/2003 | Loui et al. |
| 2004/0000529 A1 | 1/2004 | Gladnick et al. |
| 2004/0000612 A1 | 1/2004 | Young |
| 2004/0026439 A1 | 2/2004 | Bolton |
| 2004/0075015 A1 | 4/2004 | Cain et al. |
| 2004/0104316 A1 | 6/2004 | Turvey |
| 2004/0124598 A1 | 7/2004 | Williams |
| 2004/0139398 A1 | 7/2004 | Testa et al. |
| 2004/0178298 A1 | 9/2004 | Kennard |
| 2004/0262385 A1 | 12/2004 | Blaeuer |
| 2005/0040615 A1 | 2/2005 | Frommherz |
| 2005/0056718 A1 | 3/2005 | Kamenstein |
| 2005/0205578 A1 | 9/2005 | Yeh |
| 2005/0284729 A1 | 12/2005 | LoRusso |
| 2006/0049591 A1 | 3/2006 | Pennell |
| 2006/0097467 A1 | 5/2006 | Solomon et al. |
| 2006/0124799 A1 | 6/2006 | Johnson |
| 2006/0226187 A1 | 10/2006 | Linker |
| 2007/0095769 A1 | 5/2007 | Jenkins |
| 2007/0176058 A1 | 8/2007 | Kohn |
| 2007/0186515 A1 | 8/2007 | Ruetten et al. |
| 2007/0204044 A1 | 8/2007 | Rice et al. |
| 2007/0261159 A1 | 11/2007 | Marks |
| 2007/0278359 A1 | 12/2007 | Kandah |
| 2008/0000910 A1 | 1/2008 | Gaillard |
| 2008/0001019 A1 | 1/2008 | Brown |
| 2008/0169253 A1 | 7/2008 | Vitale |
| 2008/0202851 A1 | 8/2008 | Schwenke et al. |
| 2008/0215448 A1 | 9/2008 | Boyle et al. |
| 2008/0215449 A1 | 9/2008 | Boyle et al. |
| 2008/0217342 A1 | 9/2008 | Cinque |
| 2008/0245684 A1 | 10/2008 | Yeatman |
| 2009/0078731 A1 | 3/2009 | Yi |
| 2009/0078815 A1 | 3/2009 | Tong et al. |
| 2009/0092342 A1 | 4/2009 | Rolim de Oliveira |
| 2009/0184162 A1 | 7/2009 | Rice et al. |
| 2009/0261050 A1 | 10/2009 | Curren |
| 2009/0319352 A1 | 12/2009 | Boyle et al. |
| 2009/0327087 A1 | 12/2009 | Beck et al. |
| 2010/0096514 A1 | 4/2010 | Adair et al. |
| 2010/0102014 A1 | 4/2010 | Yang |
| 2010/0123050 A1 | 5/2010 | Astwood |
| 2010/0148019 A1 | 6/2010 | Simhaee |
| 2010/0206825 A1 | 8/2010 | Johnston et al. |
| 2010/0218370 A1 | 9/2010 | Lin |
| 2010/0219219 A1 | 9/2010 | Svetina |
| 2010/0264101 A1 | 10/2010 | Ma |
| 2010/0289234 A1 | 11/2010 | Sonnendorfer et al. |
| 2011/0266092 A1 | 11/2011 | Marquis et al. |
| 2012/0125970 A1 | 5/2012 | Tsui |
| 2012/0167182 A1 | 6/2012 | Rice et al. |
| 2012/0169020 A1 | 7/2012 | Farrell |
| 2012/0305618 A1 | 12/2012 | Tan |
| 2012/0305619 A1 | 12/2012 | Tan |
| 2013/0026120 A1 | 1/2013 | Johnson |
| 2013/0037665 A1 | 2/2013 | Brasell et al. |
| 2013/0048689 A1 | 2/2013 | Ling |
| 2013/0092804 A1 | 4/2013 | Laitila et al. |
| 2013/0134181 A1 | 5/2013 | Helseth et al. |
| 2013/0264242 A1 | 10/2013 | Wojno |
| 2013/0330163 A1 | 12/2013 | Marsh |
| 2014/0048576 A1 | 2/2014 | Tan |

(56) References Cited

U.S. PATENT DOCUMENTS

| | | | |
|---|---|---|---|
| 2014/0131506 A1 | 5/2014 | Clarkin | |
| 2014/0144966 A1 | 5/2014 | Tan | |
| 2014/0209651 A1 | 7/2014 | Wilfong | |
| 2014/0367507 A1 | 12/2014 | Trampolski | |
| 2015/0048039 A1* | 2/2015 | Laitila | A47F 13/085 |
| | | | 211/85.15 |
| 2016/0016752 A1 | 1/2016 | Helseth et al. | |
| 2016/0096542 A1 | 4/2016 | Fukushima | |
| 2016/0107668 A1 | 4/2016 | Robins | |
| 2016/0183744 A1 | 6/2016 | Sadikov et al. | |
| 2016/0227969 A1 | 8/2016 | Morris | |
| 2016/0242605 A1 | 8/2016 | Heymann et al. | |
| 2016/0270607 A1 | 9/2016 | Zeng | |
| 2016/0300235 A1 | 10/2016 | Boyle et al. | |
| 2016/0311454 A1 | 10/2016 | Hendrick et al. | |
| 2016/0367088 A1 | 12/2016 | Allard et al. | |
| 2017/0066550 A1 | 3/2017 | Tsai | |
| 2017/0172322 A1 | 6/2017 | Bacallao | |
| 2017/0174242 A1 | 6/2017 | Bacallao | |
| 2017/0174243 A1 | 6/2017 | Bacallao et al. | |
| 2017/0197650 A1 | 7/2017 | Whistler | |
| 2017/0259959 A1 | 9/2017 | Nilsson et al. | |
| 2017/0267412 A1 | 9/2017 | Krause | |
| 2017/0275126 A1 | 9/2017 | Sudhir | |
| 2017/0325603 A1 | 11/2017 | Bacallao | |
| 2017/0349200 A1 | 12/2017 | Winton et al. | |
| 2018/0009460 A1 | 1/2018 | Bacallao et al. | |
| 2018/0027994 A1 | 2/2018 | Bacallao et al. | |
| 2018/0049564 A1 | 2/2018 | Bacallao | |
| 2018/0093690 A1 | 4/2018 | Bacallao et al. | |

FOREIGN PATENT DOCUMENTS

| | | | | |
|---|---|---|---|---|
| AU | 2003272329 | | 6/2004 | |
| CA | 2789288 A1 | | 3/2014 | |
| CA | 2958358 A1 | | 8/2017 | |
| DE | 29806330 U | | 7/1998 | |
| EP | 1182859 A2 | | 2/2002 | |
| EP | 1510944 A1 | | 3/2005 | |
| EP | 2387772 A1 | | 11/2011 | |
| EP | 2438562 A1 | | 4/2012 | |
| GB | 2468351 | * | 9/2010 | ............... B60R 7/08 |
| GB | 2547525 A1 | | 8/2017 | |
| JP | 2000112997 | | 4/2000 | |
| JP | 2007323453 A | | 12/2007 | |
| JP | 2008282412 A | | 11/2008 | |
| WO | 2002029702 | | 4/2002 | |
| WO | 2004042614 | | 5/2004 | |
| WO | 2004038997 | | 6/2004 | |
| WO | 2005094407 | | 10/2005 | |
| WO | 2006012538 | | 2/2006 | |
| WO | 2007141417 A1 | | 12/2007 | |
| WO | 2010083113 | | 7/2010 | |
| WO | 2011008625 | | 1/2011 | |
| WO | 2013079878 A1 | | 6/2013 | |

OTHER PUBLICATIONS

Search Report in UK Patent Application No. GB1621564.2 dated Jun. 15, 2017; 5 pages.
Search Report in UK Patent Application No. GB1702839.0 dated Jun. 14, 2017; 5 pages.
Notice of Allowance in U.S. Appl. No. 16/053,248 dated Oct. 11, 2018; 7 pages.
Final Office Action in U.S. Appl. No. 15/383,126 dated Nov. 14, 2018; 6 pages.
Notice of Allowance in U.S. Appl. No. 15/383,170 dated Dec. 6, 2018; 5 pages.
Notice of Allowance in U.S. Appl. No. 15/383,151 dated Dec. 21, 2018; 9 pages.
Restriction Requirement in U.S. Appl. No. 15/433,365 dated Dec. 31, 2018; 5 pages.
Non-Final Office Action in U.S. Appl. No. 15/433,388 dated Dec. 31, 2018; 6 pages.
Notice of Allowance in U.S. Appl. No. 15/383,126 dated Jan. 15, 2019; 5 pages.
Non-Final Office Action in U.S. Appl. No. 15/433,365 dated Feb. 5, 2019; 8 pages.
Non-Final Office Action in U.S. Appl. No. 15/676,218 dated Feb. 22, 2019; 12 pages.
Search Report in GB Patent Application No. GB1713267.1, dated Dec. 22, 2017; 5 pages.
Non-Final Office Action in U.S. Appl. No. 15/653,768, dated Jan. 10, 2018; 31 pages.
Non-Final Office Action in U.S. Appl. No. 15/641,367, dated Jan. 12, 2018; 9 pages.
Non-Final Office Action in U.S. Appl. No. 15/703,307, dated Jan. 18, 2018; 9 pages.
Search Report in GB Patent Application No. GB1713283.8, dated Dec. 22, 2017; 4 pages.
"Universal Double Car Vehicle Hangers/Hooks Grocery Bags/Handbags/Umbrellas Organizer—Black," DealsMachine.com, accessed on Oct. 15, 2015; 2 pages.
"Over-the-Door Hook 3 Hook InterDesign," Target.com, accessed on Oct. 15, 2015; 4 pages.
JoshM "Smart Shopping Cart: Bagging Station Design," EECS398SmartShoppingCart.blogspot.in, Mar. 22, 2015; 2 pages.
"Clear Suspended Ceiling Hook," DoItBest.com, accessed on Oct. 14, 2015; 3 pages.
"Industrial T-shirt Bag Stand—Just like Grocery Stores," SmallBizWarehouse.com, accessed on Oct. 14, 2015; 4 pages.
"Dual L-Shape Flash Bracket Holder Mount for Canon Nikon Speedlikte DSLR Camera," Amazon.com, accessed on Jan. 5, 2016; 5 pages.
"InterDesign Classico Over-the-Door Tie and Belt Rack," HoldnStorage.com, accessed on Nov. 22, 2016; 2 pages.
"Small Matte 'So-Hooked' Rack," The Container Store, accessed on Nov. 22, 2016; 2 pages.
"POS Check Out Plastic Bag Holder Dispenser for Retail Supermarket Brand New!" Ebay.com, accessed on Nov. 17, 2016; 5 pages.
"Lot 2 Royston Plastic Grocery Bag Holder Dispenser Stand Point of Sale Shopping," TeraPeak.com, accessed on Nov. 17, 2016; 3 pages.
"Bag Holders," ULINE.mx, accessed on Nov. 17, 2016; 1 page.
"OEM Express Checkout Counter / Customized Supermarket Cash Register Stands Counters," Guangzhou ECO Commerical Equipment Co., Ltd, SupermarketCheckoutCounters.com, accessed on Nov. 17, 2016; 3 pages.
"Retrospec Bicycles Detachable Steel Half-Mesh Apollo Bike Basket with Handles," Retrospec Bicycles, Amazon.com, accessed on Apr. 27, 2017; 1 page.
"Transport trolley / waste / with waste bag holder / 1-bag WASTY 70 LT Francehopital," MedicalExpo.com, accessed on Apr. 25, 2017; 25 pages.
Jackie, "How to Make a Clothespin Bag," TheHappyHousewife.com, Apr. 19, 2012; 14 pages.
"Gluman Combo of 12 Sparkle Clothes Hangers (Yellow) and 6 Plastic Kitchen Storage Containers Blue (125 ml)," PAYtm.com, accessed on Apr. 24, 2017; 3 pages.
"Pack-N-Tote Reusable Grocery Cart Bag, Hooks Directly to the Shopping Cart, Black," Six Mour Creations, Amazon.com, accessed on Apr. 24, 2017; 5 pages.
"Toygully 12 Pack Solid Steel Finish Hangers with Clips strong," PAYtm.com, accessed on Apr. 26, 2017; 3 pages.
Search Report in United Kingdom Patent Application No. GB1621567.5, dated Jun. 14, 2017; 5 pages.
Notice of Allowance in U.S. Appl. No. 29/572,901, dated May 17, 2017; 9 pages.
"Actionclub Wall Mount Grocery Bag Dispenser Kitchen Plastic Recycle Storage Box Garbage Bag Orangizer Container Holder," AliExpress.com, accessed on Jun. 14, 2017; 3 pages.
"BG001-0111 : Bag Dispenser—Single," BowmanDispensers.com, accessed on Jun. 14, 2017; 8 pages.

(56) References Cited

OTHER PUBLICATIONS

"Axis Chrome Over Cabinet Plastic Bag Holder," OrganizeIt.com, accessed on Jun. 14, 2017; 2 pages.

"Simplehuman Stainless Steel Grocery Bag Holder," ContainerStore.com, accessed on Jun. 14, 2017; 2 pages.

Non-Final Office Action in U.S. Appl. No. 16/238,705 dated Apr. 18, 2019; 7 pages.

Notice of Allowance in U.S. Appl. No. 15/433,365 dated Apr. 18, 2019; 5 pages.

Notice of Allowance in U.S. Appl. No. 15/653,768, dated May 2, 2018; 12 pages.

Notice of Allowance in U.S. Appl. No. 15/703,307, dated May 23, 2018; 5 pages.

Non-Final Office Action in U.S. Appl. No. 15/383,126, dated May 16, 2018; 6 pages.

Notice of Allowance in U.S. Appl. No. 15/641,367, dated Jun. 7, 2018; 5 pages.

Non-Final Office Action in U.S. Appl. No. 15/383,151, dated May 25, 2018; 13 pages.

Non-Final Office Action in U.S. Appl. No. 15/383,170, dated Jul. 3, 2018; 10 pages.

Notice of Allowance and Fees Due in U.S. Appl. No. 15/433,388, dated May 21, 2019; 5 pages.

Final Office Action in U.S. Appl. No. 15/676,218, dated Jul. 25, 2019; 7 pages.

Restriction Requirement in U.S. Appl. No. 16/102,954 dated Jul. 3, 2019; 7 pages.

Notice of Allowance in U.S. Appl. No. 16/239,064 dated Aug. 15, 2019; 13 pages.

Notice of Allowance in U.S. Appl. No. 16/238,705 dated Aug. 21, 2019; 5 pages.

Notice of Allowance in U.S. Appl. No. 15/676,218 dated Sep. 16, 2019; 10 pages.

Notice of Allowance in U.S. Appl. No. 16,102,954 dated Sep. 10, 2019; 8 pages.

\* cited by examiner

FIG. 11

SHOPPING CART BAGGING STATION AND METHOD OF FORMING THE SAME

CROSS REFERENCE TO RELATED APPLICATION

This application claims priority to U.S. provisional patent application Ser. No. 62/377,135, filed Aug. 19, 2016 to Applicant Wal-Mart Stores Inc., and entitled "Shopping Cart Bagging Station and method of Forming the Same", and this application claims priority to U.S. provisional patent application Ser. No. 62/377,143, filed Aug. 19, 2016 to Applicant Wal-Mart Stores Inc., and entitled "Shopping Cart Bagging Station and method of Forming the Same", which are both incorporated entirely herein by reference.

BACKGROUND OF THE INVENTION

Technical Field

This invention relates to retail store fixtures, and, more specifically, to a bagging station that couples to a shopping cart.

State of the Art

A bagging station is a fixture located in a retail store that holds a stack of shopping bags, often plastic shopping bags, and dispenses these bags as they are filled with products a customer has purchased. The shopping bags are held in a manner and position such that it is easy and convenient for a person to open one bag at a time, place purchased items in the bag, and then remove the bag and the enclosed products from the bagging station. Bagging stations have traditionally been located at checkout stations where customers pay for their products, because that is where the products have traditionally been transferred from a shopping cart to the shopping bags. With the advent of electronic purchasing and self-checkout, however, customers are now able to pay for and bag their products as they shop, and these actions can occur at locations other than at checkout stations. There is a need for bagging stations at locations in retail stores besides the checkout station.

Accordingly, what is needed is a bagging station that can be mounted in a shopping cart, so that customers can bag their purchases as they shop.

DETAILED DESCRIPTION OF EMBODIMENTS OF THE INVENTION

Disclosed herein are embodiments of an invention related to retail store fixtures, and, more specifically, to a bagging station that couples to a shopping cart. The disclosed combination of a shopping cart and a shopping cart bagging station can be used by customers to bag their purchases as they shop. The disclosed shopping cart bagging station includes a center piece, a first and a second handle arm assembly, and a back plate. The center piece includes a bag holder hook that at least one shopping bag hangs from. The first and the second handle arm assembly each include a handle holder arm that an arm of the at least one shopping bag hangs from. The first and the second handle arm assembly slidingly insert into a hollow body of the center piece and are adjustably coupled to the center piece. The back plate couples the bagging station to the shopping cart by securing a side of the shopping cart between the back plate and the center piece. The bag holder hook and the handle holder arms hold one or more shopping bags, and dispense the shopping bags one at a time as products are placed in a shopping bag. The bagging station is coupled to the shopping cart so the bagging station can be easily used by a customer to bag their purchases as they shop. The bag holder hook holds the at least one shopping bag. The first and the second handle holder arms hold the handles of the at least one shopping bag so the shopping bag is held open and items can be placed in the shopping bag.

The bagging station includes couplers which couple the back plate to the center piece, and also couple the shopping cart bagging station to the shopping cart. The shopping cart bagging station is coupled to the shopping cart by coupling the back plate to the center piece such that a side of the shopping cart is secured between the back plate and the center piece. The shopping cart bagging station can be mounted in various locations on a shopping cart, making it easy and convenient for a customer to carry and load a plurality of shopping bags as they shop. The shopping cart bagging station is a fixed shopping cart bagging station that often stays with the shopping cart indefinitely. The shopping cart bagging station is often coupled to the shopping cart with bolts, for example, and so is not designed to be removed and re-attached often. The disclosed shopping cart bagging station provides a means for a customer to load purchases into bags as they shop, instead of having to bag their purchases at a checkout station.

Disclosed herein is a shopping cart bagging station that includes a means to dispense shopping bags, and a means to couple the means to dispense shopping bags to a shopping cart. In some embodiments, the means to couple the means to dispense shopping bags to the shopping cart includes a means to capture a side of the shopping cart between the means to dispense shopping bags and the means to couple the means to dispense shopping bags to a shopping cart. The means to dispense shopping bags and the means to couple the means to dispense shopping bags to a shopping cart can take many different forms, some examples of which are shown and described in this document. The examples shown and described are not meant to be limiting, and many other variations are possible in light of the teachings in this document.

Figure 1:
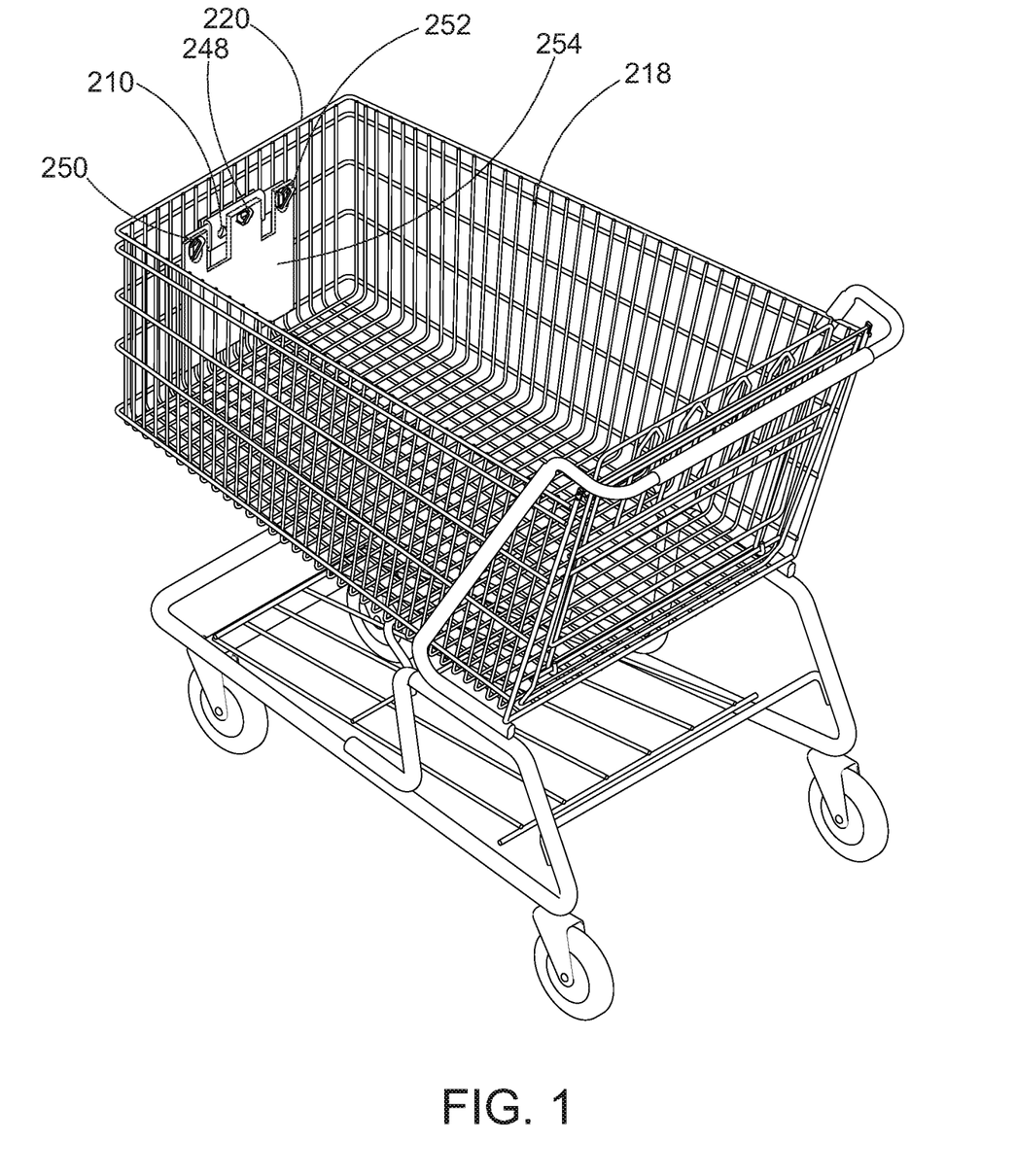
FIG. 1 shows a combination of a shopping cart and a shopping cart bagging station coupled to the shopping cart.
Figure 2:
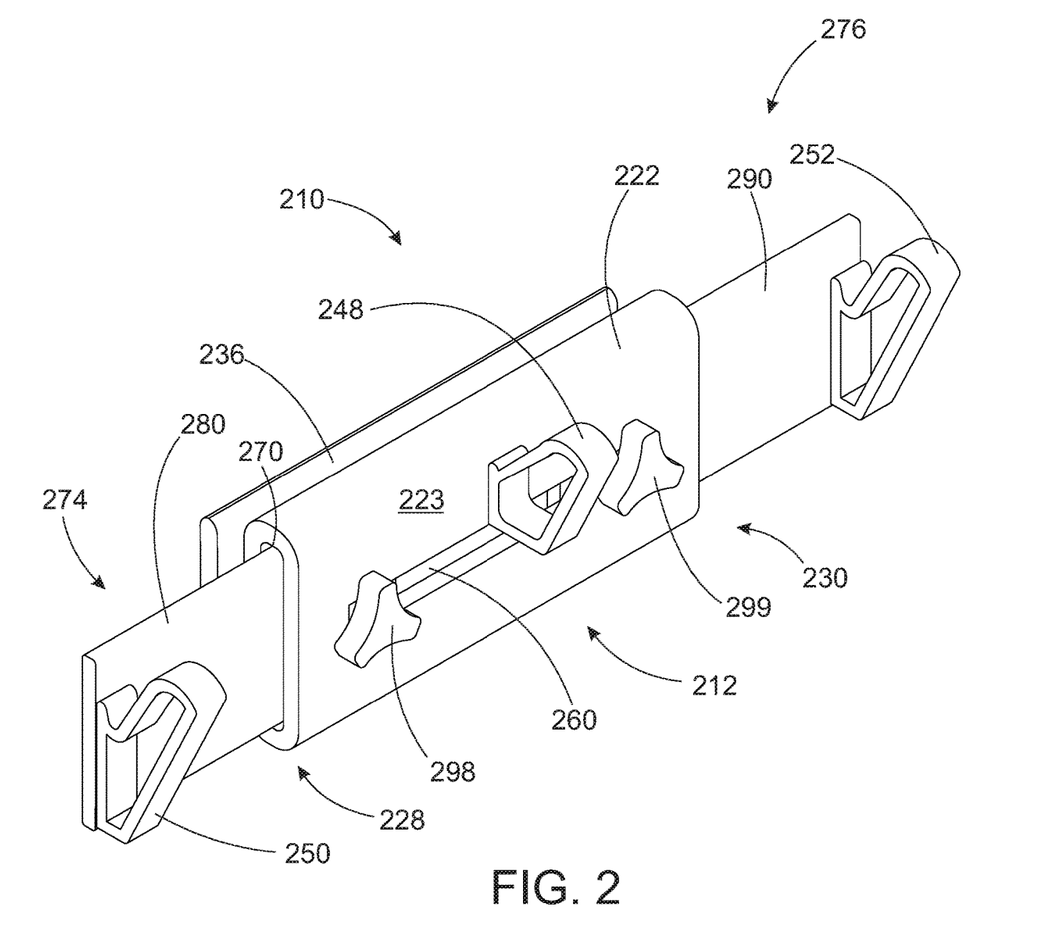
FIG. 2 shows a perspective view of a shopping cart bagging station.
Figure 3:
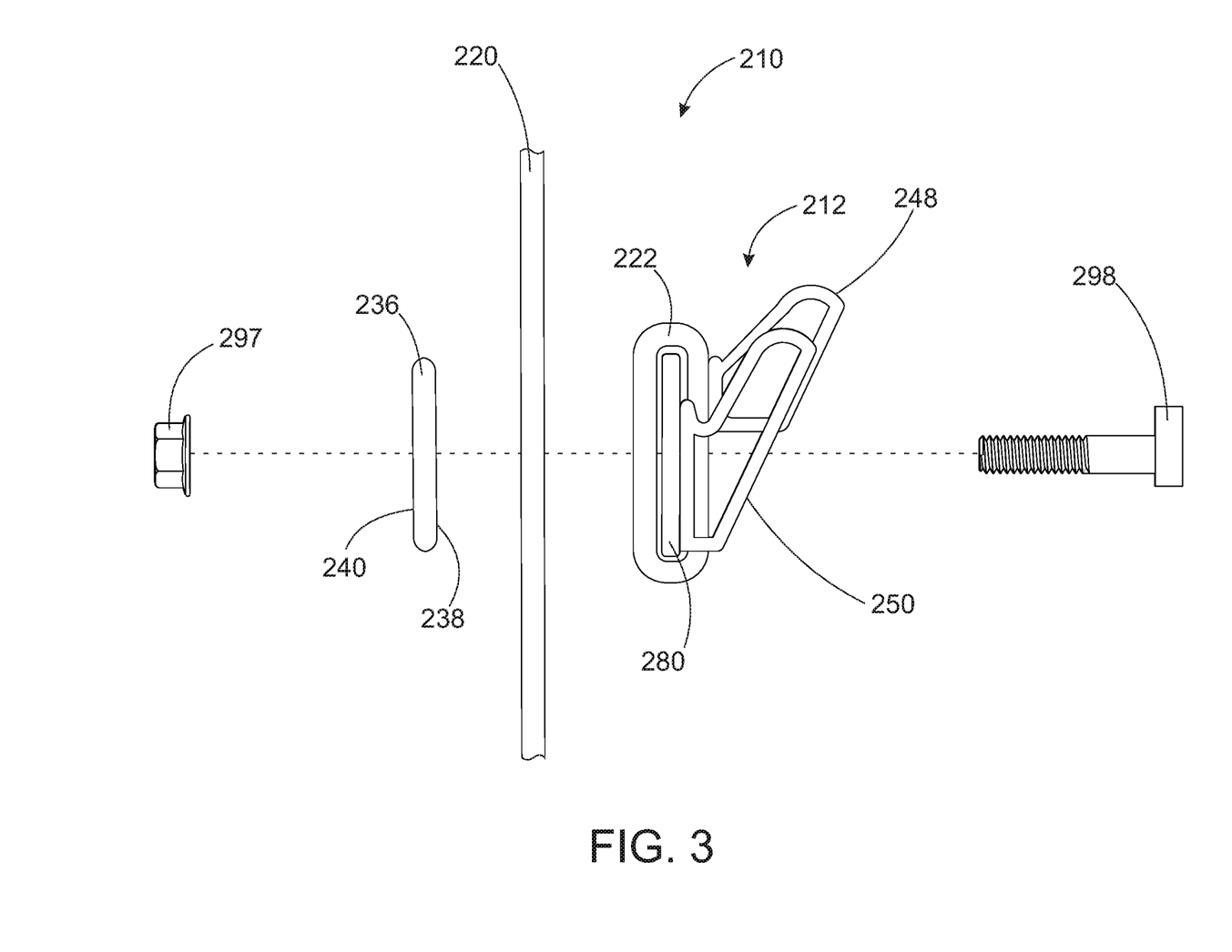
FIG. 3 is an exploded side view of the combination of FIG. 1, showing the shopping cart bagging station of FIG. 2 coupled to a side of the shopping cart.
Figure 4:
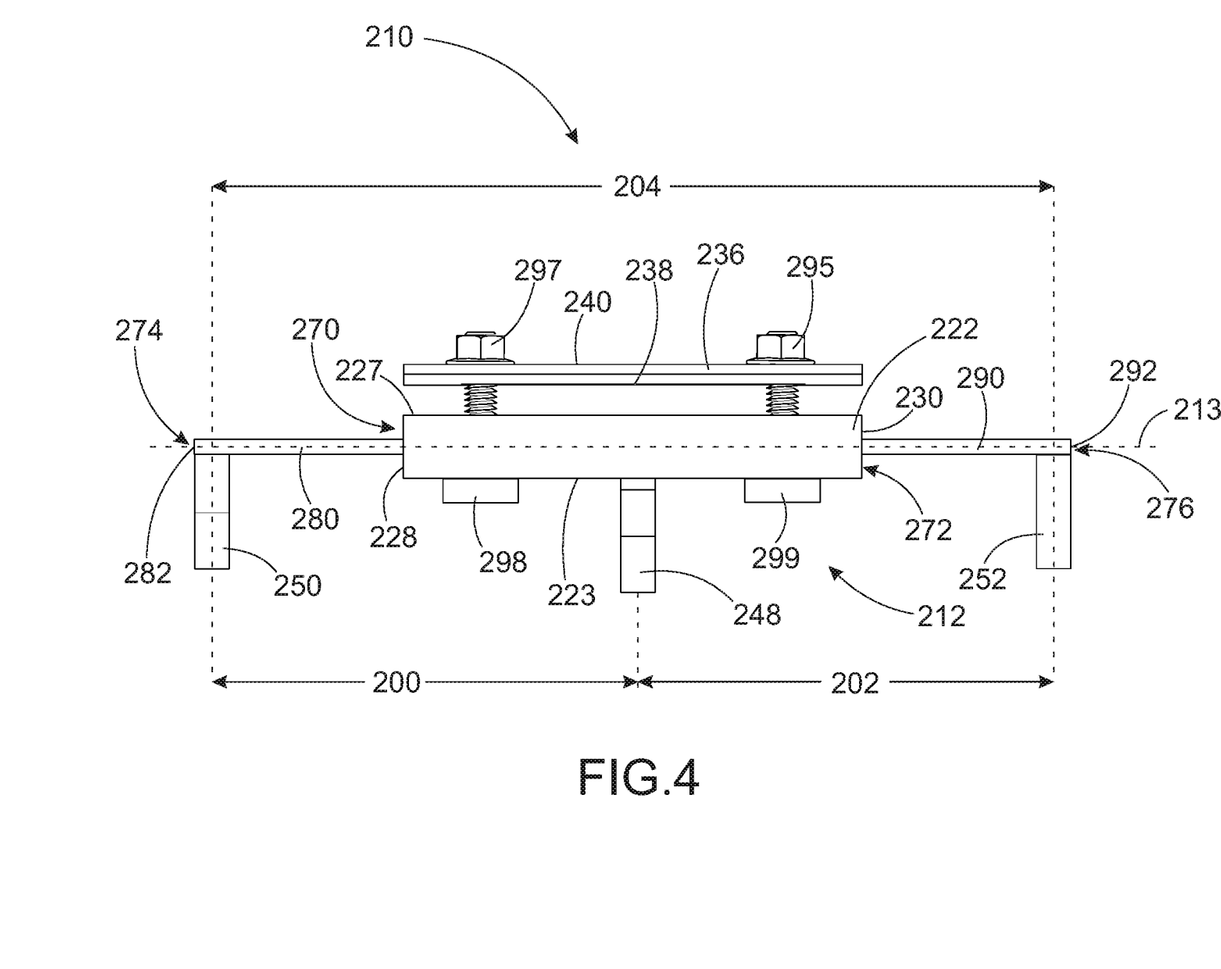
FIG. 4 is a top view of the shopping cart bagging station of FIG. 2.
Figure 5:
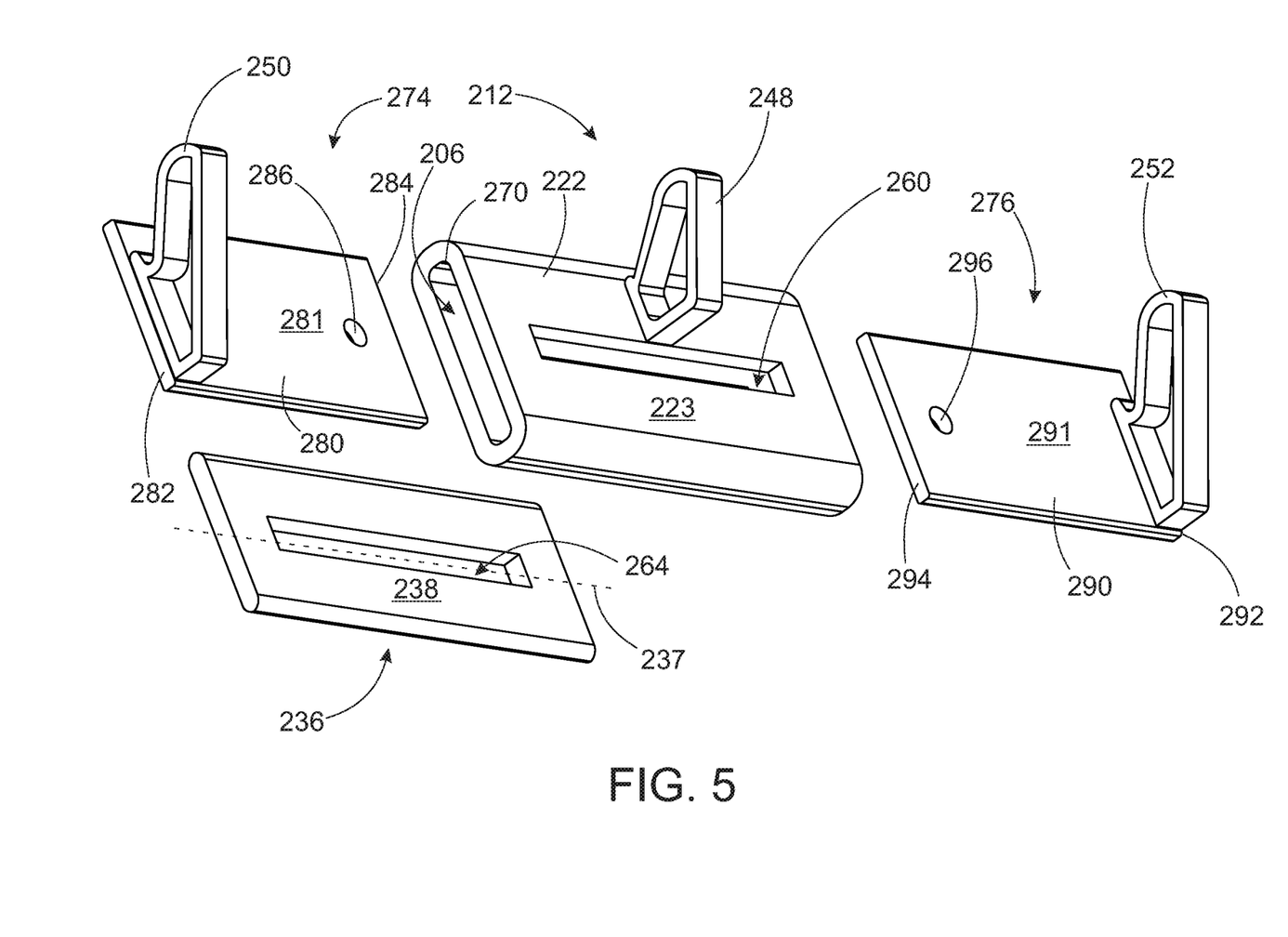
FIG. 5 shows a perspective view of the components of the shopping cart bagging station of FIG. 2.

FIG. 1 and FIG. 3 show a combination of a shopping cart 218 and a shopping cart bagging station 210. FIG. 2 and FIG. 4 through FIG. 5 show additional details of shopping cart bagging station 210. FIG. 1 shows a perspective view of shopping cart bagging station 210 coupled to a side 220 of shopping cart 218. A plurality of shopping bags 254 is hung from shopping cart bagging station 210. FIG. 2 shows a front perspective view of shopping cart bagging station 210. FIG. 3 shows a side exploded view of shopping cart bagging station 210 coupled to side 220 of shopping cart 218. FIG. 4 shows a top view of shopping cart bagging station 210. FIG. 5 shows a perspective view of the components of shopping cart bagging station 210.

Shopping cart 218 includes at least one side 220. Shopping cart bagging station 210 is coupled to side 220 in the embodiment shown. Shopping cart 218, in this embodiment, is a shopping cart often found in grocery stores and other retail stores. It is to be understood that shopping cart 218 can take many other forms.

Shopping cart bagging station 210 includes a center piece 212, a first handle arm assembly 274, a second handle arm assembly 276, and a back plate 236, as shown in the figures and best seen in FIG. 5. Shopping cart bagging station 210 is coupled to shopping cart 218 so that shopping cart bagging station 210 can be used by a customer to bag items while the customer is shopping. Shopping cart bagging station 210 is often coupled to shopping cart 218 and remains on shopping cart 218 so that customers using shopping cart 218 can use shopping cart bagging station 210. Shopping cart bagging station 210 is removeably coupled to shopping cart 218, but is not meant to be removed often.

Center piece 212 includes a bag holder hook 248 that holds plurality of shopping bags 254, see FIG. 1. First handle holder arm assembly 274 includes a first handle holder arm 250 that a shopping bag handle is hung from. Second handle holder arm assembly 276 includes a second handle holder arm 252 to hang a second shopping bag handle from. First and second handle holder arm assemblies 274 and 276 each adjustably and slidingly couple to center piece 212 so that bagging station 210 can be adjusted in size for different size shopping bags and different size shopping carts. Back plate 236 couples bagging station 210 to shopping cart 218 by capturing side 220 of shopping cart 218 between back plate 236 and center piece 212 when coupling back plate 236 to center piece 212, as can best be seen in FIG. 3.

In the embodiment shown in FIG. 1 through FIG. 5, center piece 212 and first and second handle holder arm assembly 274 and 276 are the means to dispense shopping bags, but this is not meant to be limiting. The means to dispense shopping bags can take many other forms. In this embodiment, center piece 212 with bag holder hook 248 is a means to hold plurality of shopping bags 254, and first and second handle holder arm assemblies 274 and 276 with first and second handle holder arms 250 and 252 are means to hold shopping bag handles.

Figures 6, 7:
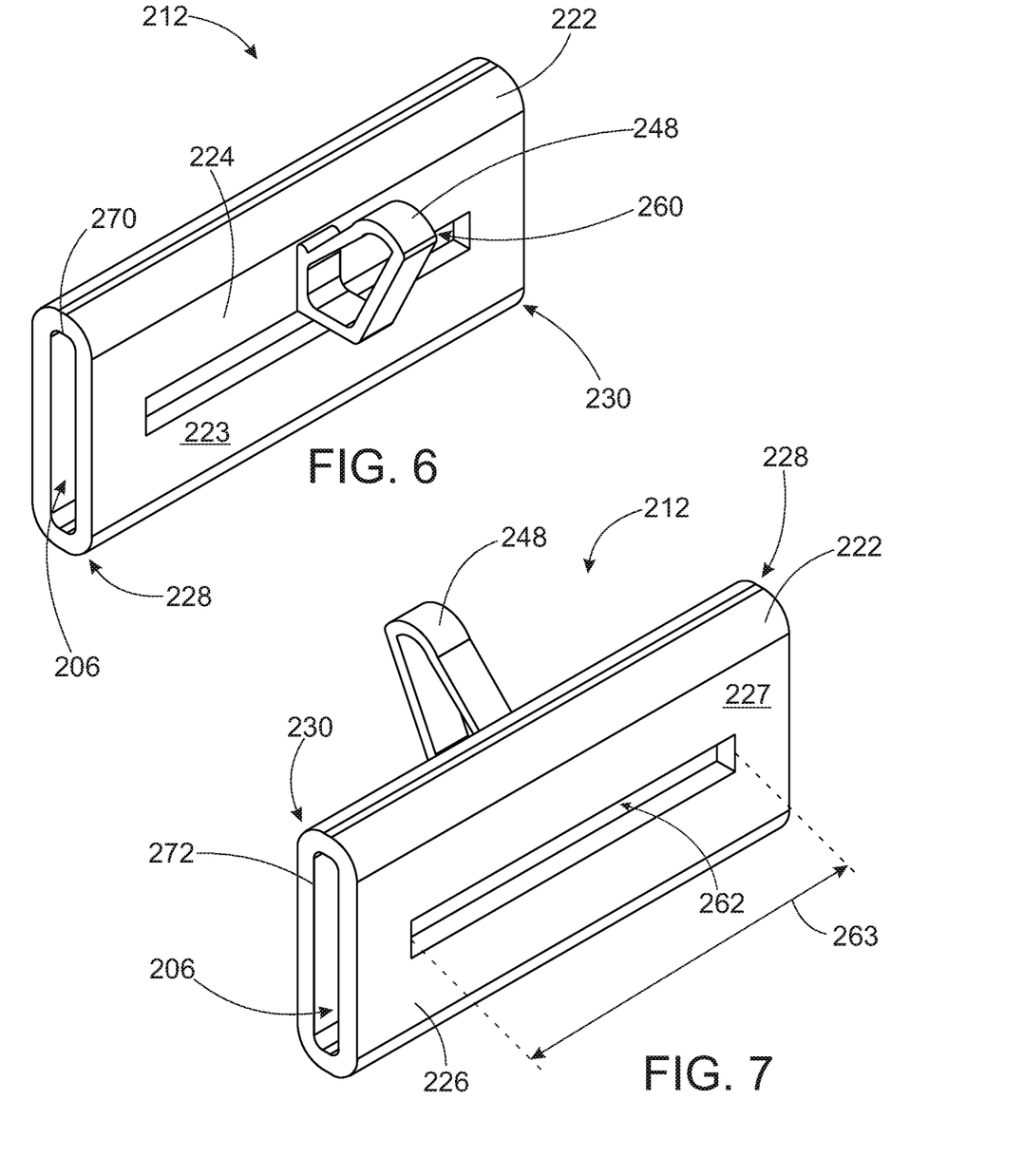
FIG. 6 shows a front perspective view of a center piece of the shopping cart bagging station of FIG. 2.
FIG. 7 shows a rear perspective view of the center piece of the shopping cart bagging station of FIG. 2.
Figure 8:
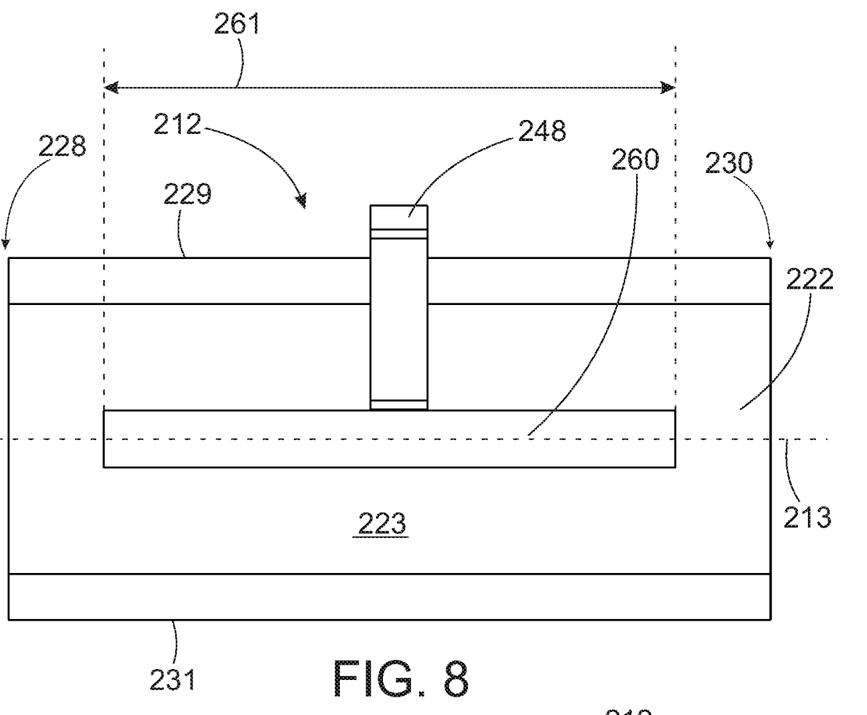
FIG. 8 shows a front view of the center piece of the shopping cart bagging station of FIG. 2.
Figure 9:
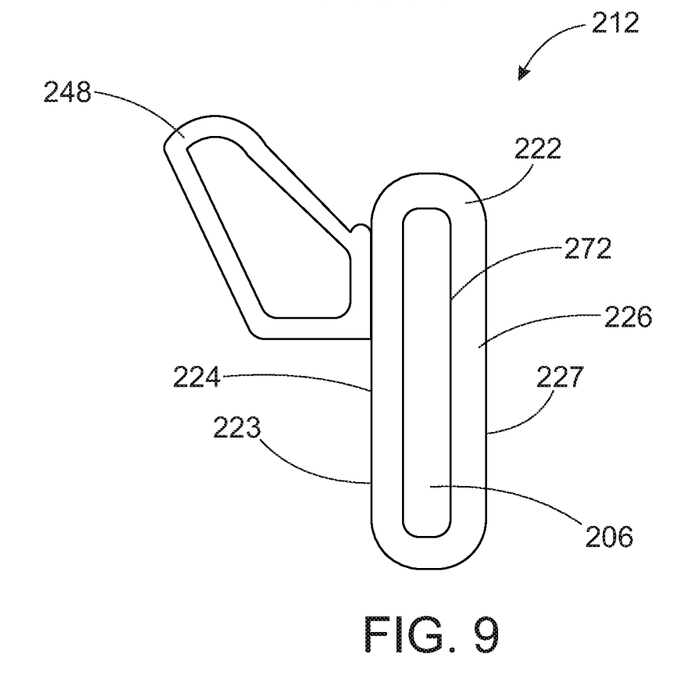
FIG. 9 shows a side view of the center piece of the shopping cart bagging station of FIG. 2.

Center piece 212 is shown in detail in FIG. 6, FIG. 7, FIG. 8, and FIG. 9. FIG. 6 shows a front perspective view of center piece 212. FIG. 7 shows a rear perspective view of center piece 212. FIG. 8 shows a front view of center piece 212, and FIG. 9 shows a side view of center piece 212.

Center piece 212 includes a hollow body 222 surrounding a cavity 206 (cavity 206 is best seen in FIG. 9). Hollow body 222 has a front side 224 with a front surface 223 and a rear side 226 with a rear surface 227, best seen in FIG. 6, FIG. 7, and FIG. 9. Front side 224 and rear side 226 define cavity 206 therebetween. Hollow body 222 has a first hollow body slot opening 260 extending through hollow body 222 from front surface 223 to cavity 206, as best seen in FIG. 6 and FIG. 8. First hollow body slot opening 260 has a first slot opening length 261 that extends along a center piece longitudinal axis 213 as shown in FIG. 8. Center piece longitudinal axis 213 extends longitudinally from a hollow body first end 228 to a hollow body second end 230 that opposes hollow body first end 228.

Hollow body 222 also has a second hollow body slot opening 262 extending through hollow body 222 from rear surface 227 to cavity 206, as best seen in FIG. 7. Second hollow body slot opening 262 has a second slot opening length 263 that extends along center piece longitudinal axis 213. First and second hollow body slot openings 260 and 262 both open into cavity 206 of hollow body 222. First and second hollow body slot openings 260 and 262 allow first and second handle arm assemblies 274 and 276 to adjustably couple to hollow body 222 of center piece 212, as explained herein.

Hollow body 222 has a first opening 270 in hollow body 222 at hollow body first end 228 (see FIG. 6, for example). First opening 270 opens into cavity 206. Hollow body 222 has a second opening 272 at hollow body second end 230 (FIG. 7, for example). Hollow body 222 also includes bag holder hook 248 coupled to front surface 223 of front side 224 of hollow body 222. Bag holder hook 248 is hook-shaped and faces a hollow body top edge 229, meaning the opening of bag holder hook 248 faces top edge 229 so that a stack of shopping bags can be hung on bag holder hook 248 without sliding off. Hollow body 222 in this embodiment has a cross-section in the shape of a compressed hollow cylinder, as best seen in FIG. 9. This oval-shaped cross section is advantageous for receiving first and second handle arm assemblies 274 and 276, as explained herein. The oval-shape cross section of hollow body 222 is also advantageous because it minimizes sharp corners that can damage customers or merchandise.

First and second handle arm assemblies 274 and 276 adjustably couple to hollow body 222. First and second handle arm assemblies 274 and 276 each slide into and out of hollow body 222 along longitudinal axis 213, best seen in FIG. 4.

First handle arm assembly 274 includes a first handle arm plate 280. First handle arm plate 280 has a first handle arm plate proximal end 284 and a first handle arm plate distal end 282, as seen in FIG. 5. First handle holder arm 250 is hook-shaped to receive a handle of a shopping bag. First handle holder arm 250 couples to a first handle arm plate front surface 281 at first handle arm plate distal end 282. First handle holder arm 250 faces hollow body top edge 229 (FIG. 8), meaning the hook opening of first handle holder arm 250 faces top edge 229 so that shopping bag handles can be hung from first handle holder arm 250. A first handle arm plate hole 286 is through first handle arm plate 280, located near first handle arm plate proximal end 284 of first handle arm plate 280, as shown in FIG. 5. First handle arm plate proximal end 284 of first handle arm plate 280 adjustably couples to hollow body 222. First handle arm plate proximal end 284 extends into hollow body 222 through first opening 270 to couple first handle arm assembly 274 to hollow body 222 and center piece 212. First handle arm assembly 274 is removeably and adjustably coupled to hollow body 222 by inserting first handle arm plate proximal end 284 into hollow body 222 through first opening 270 (FIG. 4 and FIG. 6), as shown in FIG. 2 through FIG. 5. First handle arm plate 280 slides into and out of hollow body 222 of center piece 212 along center piece longitudinal axis 213. First handle arm plate 280 slides into and out of hollow body 222 to adjust a distance 200 between first handle holder arm 250 and bag holder hook 248, as shown in FIG. 4. Adjusting distance 200 allows bagging station 210 to adjust to different size shopping bags and different size shopping carts.

A coupler 298 is used to both couple bagging station 210 to shopping cart 218, and to fix first handle arm assembly 274 in place with respect to hollow body 222. Coupler 298 is a threaded butterfly bolt in this embodiment, but this is not meant to be limiting. Coupler 298 can be any type of threaded bolt or coupler, or another type of coupler. Coupler 298 extends through first hollow body slot opening 260 (FIG. 6), through first handle arm plate hole 286 (FIG. 5), through second hollow body slot opening 262 (FIG. 7), through side 220 of shopping cart 218, and through a back plate slot opening 264 in back plate 236 (FIG. 5), as shown in FIG. 3 and FIG. 4. Coupler 298 extending through first hollow body slot opening 260, through first handle arm plate hole 286, through second hollow body slot opening 262, through side 220 of shopping cart 218 (FIG. 3), and through a back plate slot opening 264 in back plate 236 couples first handle arm assembly 274 to hollow body 222 and couples shopping cart bagging station 210 to shipping cart 218. Coupler 298 slides along first and second hollow body slot openings 260 and 262, and back plate slot opening 264 to slide first handle arm plate 280 into and out of hollow body 222. Tightening a nut 297 on threads of coupler 298 fixedly couples first handle arm plate 280 in hollow body 222 and secures side 220 of shopping cart 218 between back plate 236 and centerpiece 212.

Figure 10:
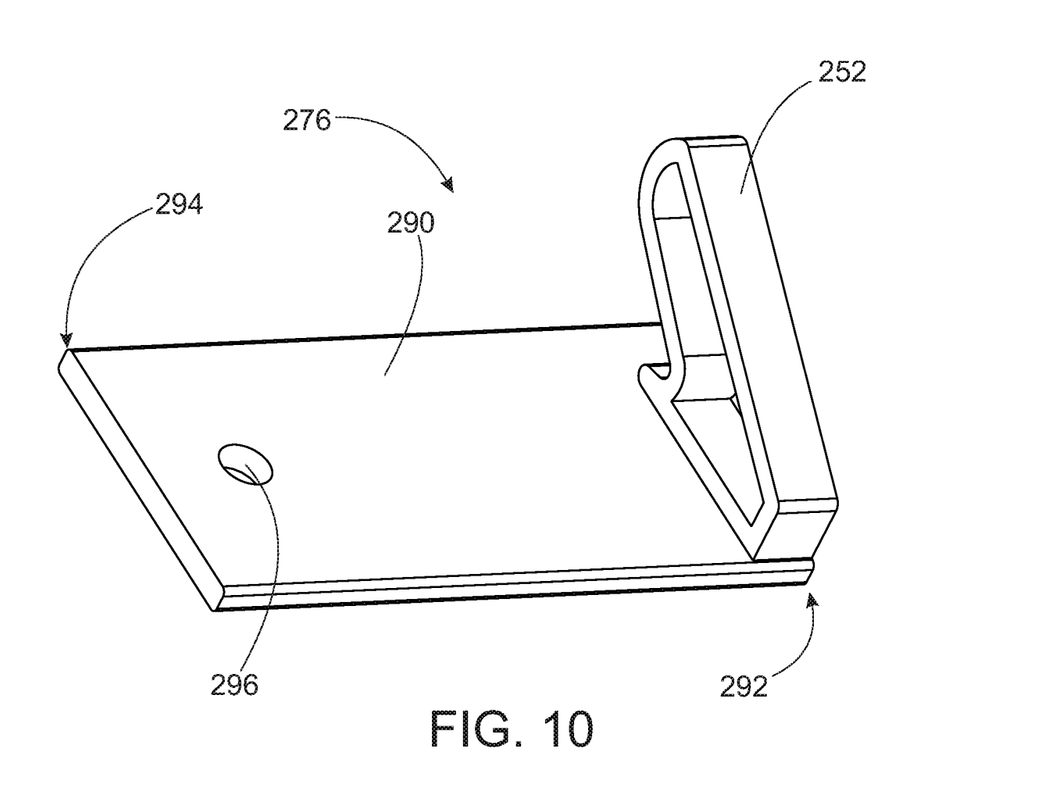
FIG. 10 shows a front perspective view of a handle arm assembly of the shopping cart bagging station of FIG. 2.

Similarly, second handle arm assembly 276 includes a second handle arm plate 290. Second handle arm plate 290 has a second handle arm plate proximal end 294 and a second handle arm plate distal end 292, as seen in FIG. 5. Second handle holder arm 252 couples to a second handle arm plate front surface 291 at second handle arm plate distal end 292. Second handle holder arm 252 faces hollow body top edge 229 (FIG. 8), meaning the hook opening of second handle holder arm 252 faces top edge 229 so that shopping bag handles can be hung from second handle holder arm 252. A second handle arm plate hole 296 is through second handle arm plate 290, located near second handle arm plate proximal end 294, as shown in FIG. 5 and FIG. 10. FIG. 10 shows a front perspective view of second handle arm assembly 276. Second handle arm plate proximal end 294 of second handle arm plate 290 adjustably couples to hollow body 222. Second handle arm plate distal end 292 opposes second handle arm plate proximal end 294. Second handle arm assembly 276 is removeably and adjustably coupled to hollow body 222 by inserting second handle arm plate proximal end 294 into hollow body 222 through second opening 272 of hollow body 222, as shown in FIG. 2 and FIG. 5. Second handle arm plate 290 slides into and out of hollow body 222 to adjust a distance 202 between second handle holder arm 252 and bag holder hook 248, as shown in FIG. 4. Adjusting distance 202 allows bagging station 210 to adjust to different size shopping bags and different size shopping carts. A coupler 299 is used to both couple bagging station 210 to shopping cart 218, and to fix second handle arm assembly 276 in place. Coupler 299 is a threaded butterfly bolt in this embodiment, but this is not meant to be limiting. Coupler 299 can be any type of threaded bolt or coupler, or another type of coupler. Coupler 299 extends through first hollow body slot opening 260 (FIG. 6), through second handle arm plate hole 296 (FIG. 5 and FIG. 10), through second hollow body slot opening 262 (FIG. 7), through side 220 of shopping cart 218 (FIG. 3), and through back plate slot opening 264 (FIG. 5), as shown in FIG. 3. Coupler 299 extending through first hollow body slot opening 260, through second handle arm plate hole 296, through second hollow body slot opening 262, through side 220 of shopping cart 218, and through back plate slot opening 264 in back plate 236 couples second handle arm assembly 276 to hollow body 222 and couples shopping cart bagging station 210 to shopping cart 218. Coupler 299 slides along first and second hollow body slot openings 260 and 262, and back plate slot opening 264 to slide second handle arm plate 290 into and out of hollow body 222. Tightening a nut 295 on threads of coupler 299 fixedly couples second handle arm plate 290 in hollow body 222 and secures side 220 of shopping cart 218 between back plate 236 and centerpiece 212.

Thus, both first and second handle arm assemblies 274 and 276 slidingly couple to hollow body 222 such that distances 200 and 202 are adjusted. Once distance 200 and 202 are adjusted as desired, couplers 298 and 299 are tightened to fix distance 200 and 202. Adjusting distance 200 and 202 also adjusts a distance 204 between first and second handle holder arms 250 and 252, as shown in FIG. 4. Thus, first and second handle holder arm assemblies 274 and 276 are both adjustably coupled to hollow body 222 such that distance 204 between first handle holder arm 250 and second handle holder arm assembly 252 is adjustable, as shown in FIG. 4.

Back plate 236 is formed of a flat piece of rigid material, rectangular in this embodiment, with a front surface 238 and a back surface 240 (FIG. 3). Back plate 236 has a back plate slot opening 264 through back plate 236. Back plate slot opening extends along a back plate longitudinal axis 237, as shown in FIG. 5. Back plate slot opening 264 extends through back plate 236 from front surface 238 to back surface 240. Coupler 298 extends through first hollow body slot opening 260, first handle arm plate hole 286, second hollow body slot opening 262, through side 220 of shopping cart 218 (FIG. 3) and through back plate slot opening 264 in back plate 236 to couple first handle arm assembly 274 to center piece 212 and to couple shopping cart bagging station 210 to shopping cart 218. Coupler 299 extends through first hollow body slot opening 260, second handle arm plate hole 296, second hollow body slot opening 262, through side 220 of shopping cart 218 (FIG. 3) and through back plate slot opening 264 in back plate 236 to couple second handle arm assembly 276 to center piece 212 and to couple shopping cart bagging station 210 to shopping cart 218. Back plate 236 couples bagging station 210 to shopping cart 218 by capturing side 220 of shopping cart 218 between back plate 236 and hollow body 222 as shown in FIG. 1 and FIG. 3. Back plate slot opening 264 allows adjustability of the placement of first and second handle arm assemblies 274 and 276.

Having multiple slot openings, specifically first and second hollow body slot openings 262 and 262 and back plate slot opening 264, provides adjustability and options for mounting shopping cart bagging station 210 to different locations on shopping cart 218. It is to be understood that couplers other than bolts 298 and 299 are used in some embodiments of shopping cart bagging station 210.

With back plate 236 coupled to center piece 212, with side 220 of shopping cart 218 secured in between back plate 236 and center piece 212, shopping cart bagging station 210 is coupled to shopping cart 218 and can be used by a customer to dispense bags as needed while the customer shops. Shopping cart bagging station 210 can be coupled to many locations on shopping cart 218. FIG. 1 shows shopping cart bagging station 210 coupled to a front side 220 of shopping cart 218, but this is not meant to be limiting. Shopping cart bagging station 210 can be coupled to the interior or exterior of shopping cart 218. Shopping cart bagging station 210 can be coupled to the front, sides, rear, edges, or bottom of shopping cart 218. In some embodiments, the shopping cart will take a form other than shopping cart 218, and the means to couple bagging station 210 to the shopping cart will take another form consistent with the form of the shopping cart.

Figure 11:
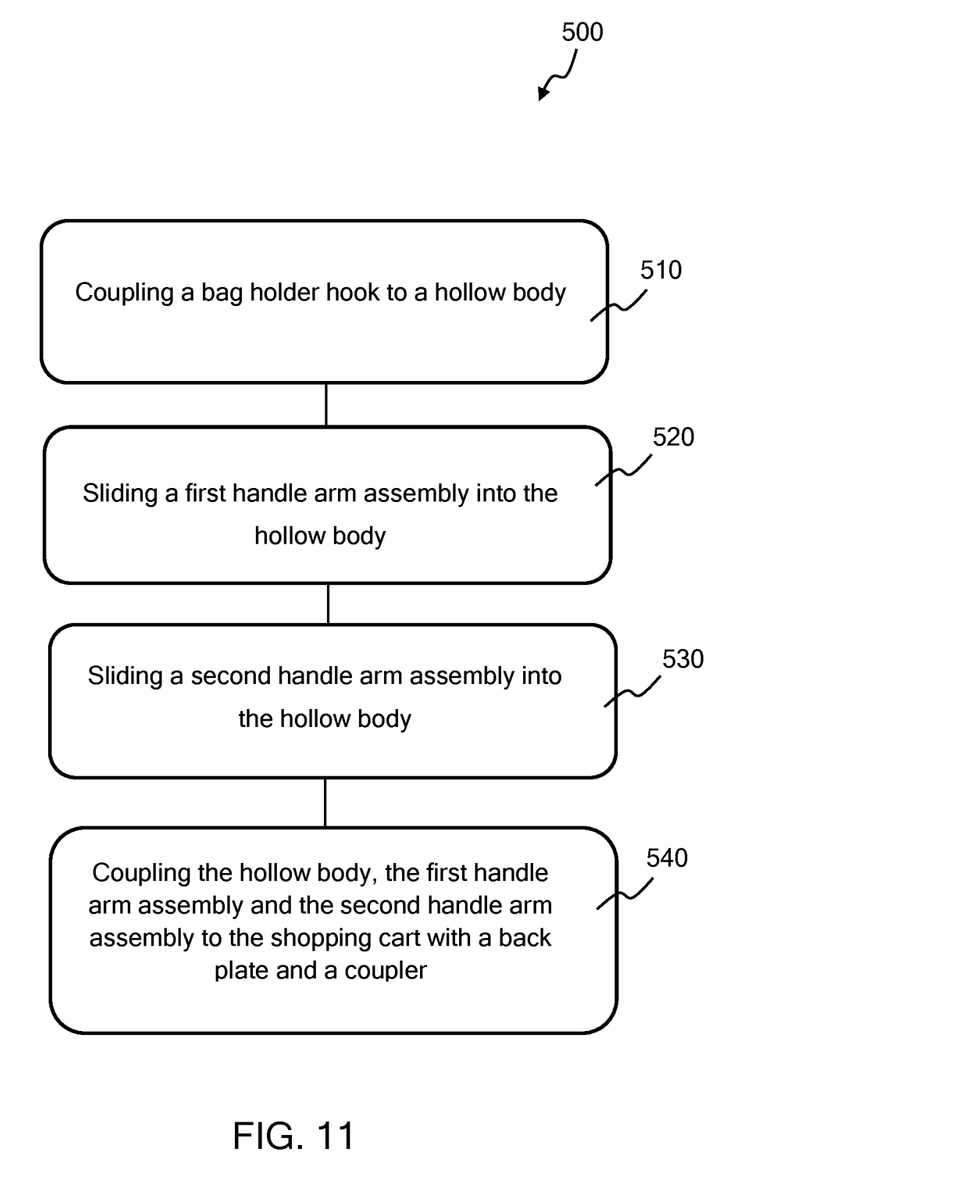
FIG. 11 illustrates a method of mounting a shopping cart bagging station to a shopping cart.

FIG. 11 illustrates a method 500 of mounting a shopping cart bagging station to a shopping cart. Method 500 includes an act 510 of coupling a bag holder hook to a hollow body. The hollow body includes a hollow body front side and a hollow body rear side, a hollow body first end having a first opening in the hollow body, and a hollow body second end having a second opening in the hollow body.

Method 500 also includes an act 520 of sliding a first handle arm assembly into the hollow body. The first handle holder arm assembly includes a first handle holder arm. In some embodiments, act 520 of sliding the first handle arm assembly into the hollow body includes sliding a first handle arm plate proximal end into the hollow body through the first opening, where the first handle arm assembly slides into and out of the hollow body to adjust a distance between the first handle holder arm and the bag holder hook.

Method 500 also includes an act 530 of sliding a second handle arm assembly into the hollow body, where the second handle holder arm assembly includes a second handle holder arm. A distance between the first handle holder arm and the second handle holder arm is adjustable. In some embodiments, act 530 of sliding the second handle arm assembly in the hollow body includes sliding a second handle arm plate proximal end into the hollow body through the second opening, where the second handle arm assembly slides into and out of the hollow body to adjust a distance between the second handle holder arm and the bag holder hook.

Method 500 also includes an act 540 of coupling the hollow body, the first handle arm assembly, and the second handle arm assembly to the shopping cart with a back plate and a coupler. A side of the shopping cart is between the back plate and the hollow body. The coupler couples the first and second handle arm assembly to the hollow body and couples the hollow body and the back plate to the shopping cart.

In some embodiments, method 500 includes coupling the first handle holder arm to a first handle arm plate distal end. In some embodiments, method 500 includes coupling the second handle holder arm to a second handle arm plate distal end.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A combination shopping cart bagging station and shopping cart comprising:
a shopping cart having at least one side; and
a shopping cart bagging station comprising:
a center piece which comprises:
a hollow body;
a first opening in the hollow body at a hollow body first end;
a second opening in the hollow body at a hollow body second end; and
a bag holder hook coupled to a hollow body front surface;
a first handle arm assembly which comprises:
a first handle arm plate having a first handle arm plate proximal end and a first handle arm plate distal end, wherein the first handle arm plate proximal end extends into the hollow body through the first opening to couple the first handle arm assembly to the center piece; and
a first handle holder arm coupled to the first handle arm plate distal end;
a second handle arm assembly which comprises:
a second handle arm plate having a second handle arm plate proximal end and a second handle arm plate distal end, wherein the second handle arm plate proximal end extends into the hollow body through the second opening to couple the second handle arm assembly to the center piece; and
a second handle holder arm coupled to the second handle arm plate distal end; and
a back plate having a back plate slot opening through the back plate;
wherein the back plate couples to the center piece with the at least one side of the shopping cart between the back plate and the center piece.

2. The combination of claim 1, wherein the center piece comprises:
a center piece longitudinal axis extending from the hollow body first end to the hollow body second end;
a first hollow body slot opening through a hollow body front side having a first slot length extending along the center piece longitudinal axis; and
a second hollow body slot opening through a hollow body rear side having a second slot length extending along the center piece longitudinal axis.

3. The combination of claim 2, wherein the first and the second handle arm plates slide into and out of the center piece along the center piece longitudinal axis.

4. The combination of claim 3, wherein the first handle arm assembly is adjustably coupled to the hollow body and wherein a first distance between the first handle holder arm and the bag holder hook is adjustable.

5. The combination of claim 4, wherein the second handle arm assembly is adjustably coupled to the hollow body and wherein a second distance between the second handle holder arm and the bag holder hook is adjustable.

6. The combination of claim 5, wherein a third distance between the first handle holder arm and the second handle holder arm is adjustable.

7. The combination of claim 3, wherein a coupler extends through the back plate slot opening, the at least one side of the shopping cart, the first hollow body slot opening, a hole through the first handle arm plate, and the second hollow body slot opening to couple the first handle arm assembly to the hollow body and to couple the shopping cart bagging station to the shopping cart.

8. The combination of claim 7, wherein the coupler slides along the back plate slot opening, the first hollow body slot opening and the second hollow body slot opening to adjustably couple the first handle arm assembly to the hollow body.

9. The combination of claim 1, wherein the hollow body has a cross-section in the shape of a compressed hollow cylinder.

10. The combination of claim 1, wherein the hollow body has an oval cross-section.

11. A shopping cart bagging station comprising:
a center piece which comprises:
  a hollow body having a hollow body front side and a hollow body rear side;
  a hollow body first end having a first opening in the hollow body;
  a hollow body second end having a second opening in the hollow body; and
  a bag holder hook coupled to the hollow body front side;
a first handle arm assembly which comprises:
  a first handle arm plate having a first handle arm proximal end and a first handle arm distal end, wherein the first handle arm assembly removeably and adjustably couples to the hollow body in response to the first handle arm proximal end being inserted into the hollow body through the first opening; and
  a first handle holder arm coupled to the first handle arm plate distal end;
a second handle arm assembly which comprises:
  a second handle arm plate having a second handle arm proximal end and a second handle arm distal end, wherein the second handle arm assembly removeably and adjustably couples to the hollow body in response to the second handle arm proximal end being inserted into the hollow body through the second opening; and
  a second handle holder arm coupled to the second handle arm plate distal end; and
a back plate coupled to the center piece, wherein the back plate comprises a flat plate of rigid material having a back plate slot opening extending along a back plate longitudinal axis.

12. The shopping cart bagging station of claim 11, wherein the first handle holder arm is coupled to a first handle arm plate front surface, and wherein the first handle holder arm faces a hollow body top edge.

13. The shopping cart bagging station of claim 11, wherein a distance between the first handle holder arm and the second handle holder arm is adjustable.

14. The shopping cart bagging station of claim 11, wherein the first and the second handle arm assembly slide into and out of the hollow body along a center piece longitudinal axis.

15. The shopping cart bagging station of claim 14, wherein the hollow body further comprises:
  a first hollow body slot opening through a hollow body front side having a first hollow body slot length extending along the center piece longitudinal axis; and
  a second hollow body slot opening through a hollow body rear side having a second hollow body slot length extending along the center piece longitudinal axis.

16. The bagging station of claim 15, wherein a coupler extends through the back plate slot opening, the first hollow body slot opening, a hole through the first handle arm plate, and the second hollow body slot opening to couple the first handle arm assembly to the hollow body.

17. The bagging station of claim 11, wherein the hollow body has a cross-section in the shape of a compressed hollow cylinder.

18. A method of mounting a shopping cart bagging station to a shopping cart, the method comprising:
  coupling a bag holder hook to a hollow body, wherein the hollow body comprises:
    a hollow body front side and a hollow body rear side;
    a hollow body first end having a first opening in the hollow body; and
    a hollow body second end having a second opening in the hollow body;
  sliding a first handle arm assembly into the hollow body, wherein the first handle holder arm assembly comprises a first handle holder arm;
  sliding a second handle arm assembly into the hollow body, wherein the second handle holder arm assembly comprises a second handle holder arm, and wherein a first distance between the first handle holder arm and the second handle holder arm is adjustable; and
  coupling the hollow body, the first handle arm assembly, and the second handle arm assembly to the shopping cart with a back plate and a coupler, wherein a side of the shopping cart is between the back plate and the hollow body, and wherein the coupler couples the first and second handle arm assembly to the hollow body and couples the hollow body and the back plate to the shopping cart.

19. The method of claim 18, wherein the sliding the first handle arm assembly in the hollow body comprises sliding a first handle arm plate proximal end into the hollow body through the first opening, and wherein the first handle arm assembly slides into and out of the hollow body to adjust a second distance between the first handle holder arm and the bag holder hook.

20. The method of claim 18, further comprising:
  coupling the first handle holder arm to a first handle arm plate distal end; and
  coupling the second handle holder arm to a second handle arm plate distal end.

* * * * *